US012597276B2

(12) United States Patent
Tsuda

(10) Patent No.: US 12,597,276 B2
(45) Date of Patent: Apr. 7, 2026

(54) DRIVING ASSISTANCE APPARATUS AND DRIVING ASSISTANCE METHOD

(71) Applicant: ISUZU MOTORS LIMITED, Yokohama (JP)

(72) Inventor: Ryuta Tsuda, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 19/011,687

(22) Filed: Jan. 7, 2025

(65) Prior Publication Data

US 2025/0232597 A1     Jul. 17, 2025

(30) Foreign Application Priority Data

Jan. 15, 2024    (JP) ................................. 2024-003999

(51) Int. Cl.
| | |
|---|---|
| *G06V 20/59* | (2022.01) |
| *B60W 50/00* | (2006.01) |
| *B60W 50/14* | (2020.01) |
| *G06V 10/75* | (2022.01) |
| *H04N 23/23* | (2023.01) |
| *H04N 23/73* | (2023.01) |

(52) U.S. Cl.
CPC ........... *G06V 20/597* (2022.01); *B60W 50/14* (2013.01); *G06V 10/751* (2022.01); *G06V 10/758* (2022.01); *H04N 23/23* (2023.01); *H04N 23/73* (2023.01); *B60W 2050/0083* (2013.01); *B60W 2420/403* (2013.01); *B60W 2540/223* (2020.02)

(58) Field of Classification Search
CPC .. G06V 20/597; G06V 10/751; G06V 10/758;

B60W 50/14; B60W 2050/0083; B60W 2420/403; B60W 2540/223; B60W 40/08; B60W 2040/0881; B60W 2050/143; H04N 23/23; H04N 23/73; G08B 21/18
See application file for complete search history.

(56) References Cited

U.S. PATENT DOCUMENTS

| | | | | |
|---|---|---|---|---|
| 2006/0212202 | A1* | 9/2006 | Ota | ........................ G08B 21/06 |
| | | | | 701/1 |
| 2018/0197030 | A1 | 7/2018 | Yamataka | |
| 2019/0367038 | A1* | 12/2019 | Fukumi | ................ G06V 20/597 |

(Continued)

FOREIGN PATENT DOCUMENTS

| | | | | | |
|---|---|---|---|---|---|
| JP | 2009246903 | A | * | 10/2009 | ............. H04N 23/11 |
| JP | 2015096413 | A | * | 5/2015 | ......... B60H 1/00742 |
| JP | 2017-016568 | A | | 1/2017 | |

*Primary Examiner* — Michael Lee
(74) *Attorney, Agent, or Firm* — Shih IP Law Group, PLLC

(57) ABSTRACT

A driving assistance apparatus has: an acquiring section that acquires an infrared image capturing an image capturing area including a driver's seat of a vehicle; a determining section that determines whether a flared highlight has occurred in the infrared image in a case where it is not possible to recognize the driver in the infrared image, on the basis of whether a pixel value of a pixel of a portion capturing an image of an area which is in the image capturing area in the infrared image and is hit by sunlight is equal to or greater than a predetermined value; and a setting section that makes waiting time longer than reference time, the waiting time being a time point at which a warning is given in a case where it is determined that the flared highlight has occurred in the infrared image.

13 Claims, 5 Drawing Sheets

(56)                References Cited

U.S. PATENT DOCUMENTS

2020/0394390 A1 *  12/2020  Zhang .................... G06V 20/59
2021/0291739 A1 *   9/2021  Kasarla .................... B60R 1/04
2023/0129320 A1 *   4/2023  Wu ........................ H04N 25/50
                                                           250/201.1
2024/0198903 A1 *   6/2024  Yamaguchi ............ G08G 1/163
2025/0086986 A1 *   3/2025  Fujino ................. G06V 10/143

* cited by examiner

DRIVING ASSISTANCE APPARATUS AND DRIVING ASSISTANCE METHOD

CROSS-REFERENCE TO RELATED APPLICATIONS

The present application claims priority to Japanese Patent Applications No. 2024-3999, filed on Jan. 15, 2024, contents of which are incorporated herein by reference in their entirety.

BACKGROUND OF THE INVENTION

The present invention relates to a driving assistance apparatus and a driving assistance method for assisting driving of a vehicle. A technology to determine whether or not there is an anomaly of the driver of a vehicle has been known. JP-2017-16568-A discloses a technology to determine whether or not there is an anomaly of the state of a driver recognized from infrared images captured in a state where there is irradiation of an infrared ray in an image capturing range of a camera.

Meanwhile, when sunlight hits a driver's seat, a flared highlight occurs in infrared images, and it becomes not possible to recognize a driver in some cases. In a case where it is not possible to recognize the driver, it is determined that there is an anomaly of the driver even if the driver is driving normally, and a warning is given undesirably, in some cases.

BRIEF SUMMARY OF THE INVENTION

The present invention has been made in view of these matters, and an object thereof is to reduce false warnings.

A first aspect of the present invention provides a driving assistance apparatus having: an acquiring section that acquires an infrared image captured while a first area including a driver's seat where a driver of a vehicle is seated is irradiated with an infrared ray; a determining section that determines whether or not a flared highlight has occurred in the infrared image in a case where it is not possible to recognize the driver in the infrared image, on a basis of whether or not a pixel value of a pixel of a determination portion capturing an image of a second area which is in the first area in the infrared image and is hit by sunlight is equal to or greater than a predetermined value; and a setting section that makes waiting time longer than reference time, the waiting time being time between a time point at which it has become not possible to recognize the driver in the infrared image and a time point at which a warning is given in a case where it is determined that the flared highlight has occurred in the infrared image.

A second aspect of the present invention provides a driving assistance method executed by a computer of a vehicle, the driving assistance method having: acquiring an infrared image captured while a first area including a driver's seat where a driver of the vehicle is seated is irradiated with an infrared ray; determining whether or not a flared highlight has occurred in the infrared image in a case where it is not possible to recognize the driver in the infrared image, on a basis of whether or not a pixel value of a pixel of a determination portion capturing an image of a second area which is in the first area in the infrared image and is hit by sunlight is equal to or greater than a predetermined value; and making waiting time longer than reference time, the waiting time being time between a time point at which it has become not possible to recognize the driver in the infrared image and a time point at which a warning is given in a case where it is determined that the flared highlight has occurred in the infrared image.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[Configuration of Driving Assistance System S]

Figure 1:
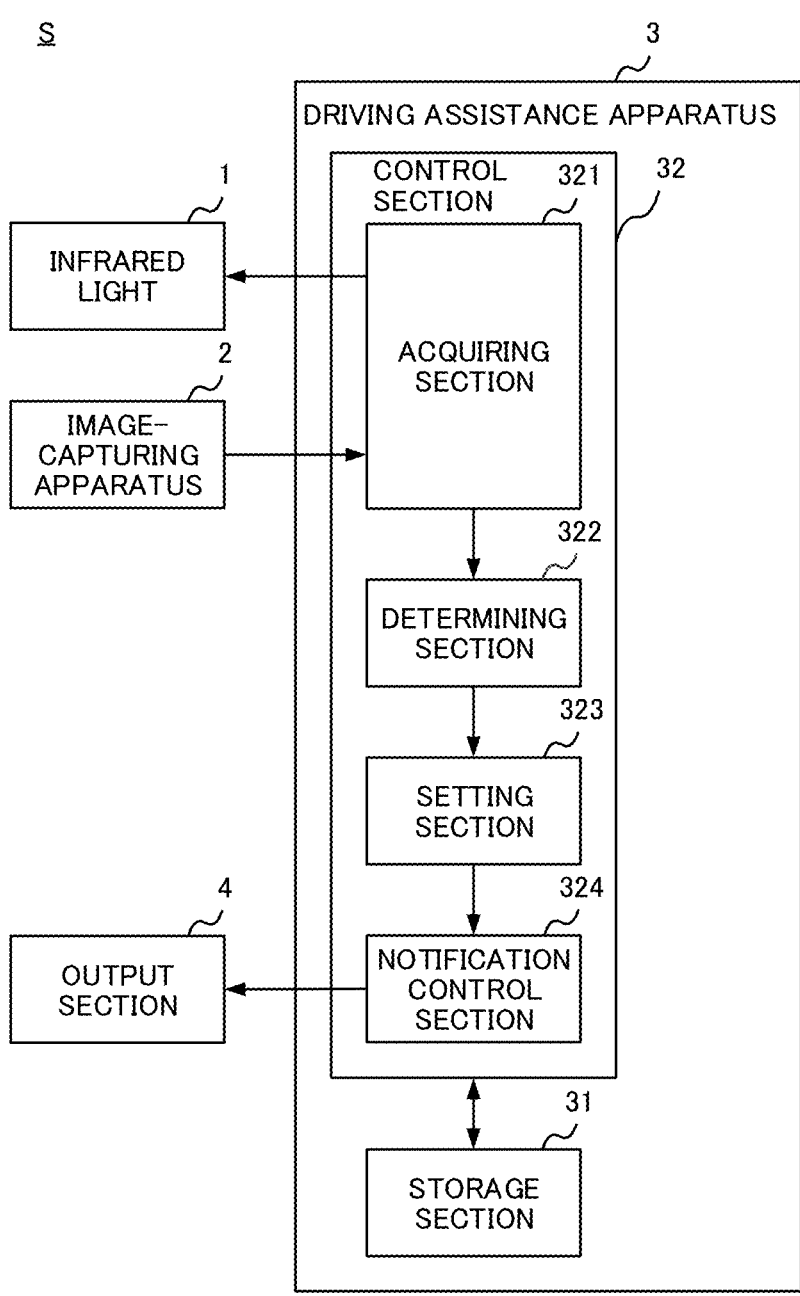
FIG. 1 is a figure for explaining the configuration of a driving assistance system.
Figure 2:
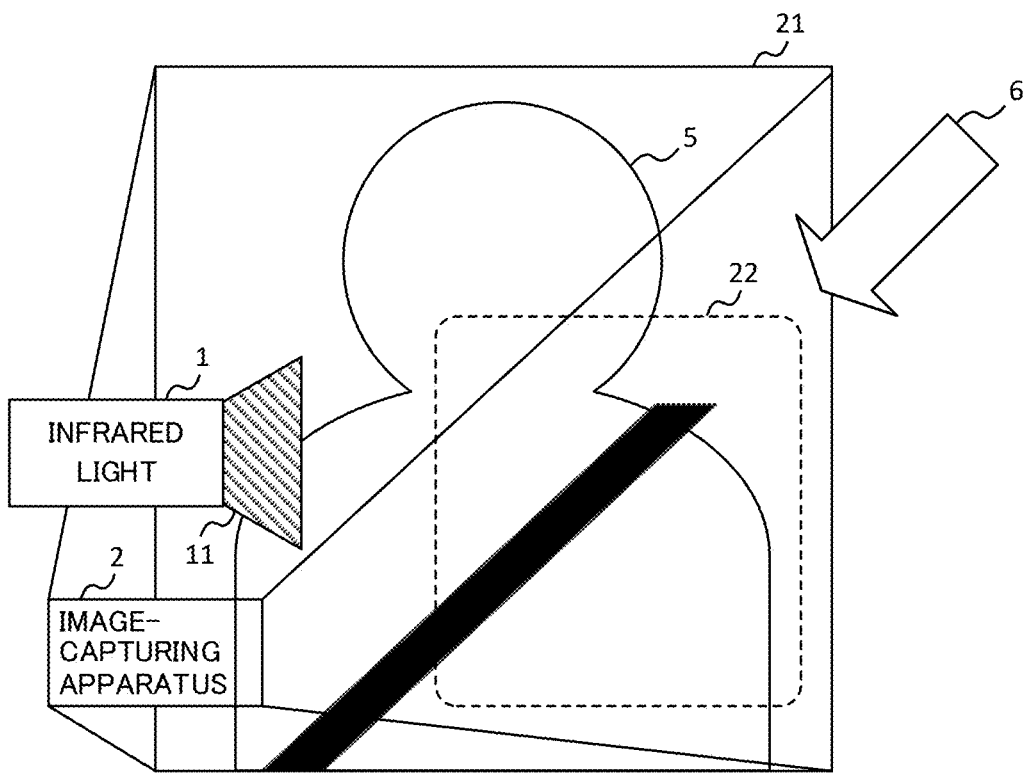
FIG. 2 is a figure for explaining an image capturing area of an image-capturing apparatus.

A driving assistance system S assists driving by a driver who drives a vehicle. The configuration of the driving assistance system S is explained using FIG. 1 and FIG. 2. FIG. 1 is a figure for explaining the configuration of the driving assistance system S. FIG. 2 is a figure for explaining an image capturing area 21 of an image-capturing apparatus 2. The driving assistance system S has an infrared light 1, the image-capturing apparatus 2, a driving assistance apparatus 3, and an output section 4.

The infrared light 1 irradiates, with an infrared ray 11, a first area, which is the image capturing area 21 including the driver's seat of the vehicle where a driver 5 is seated. The infrared light 1 irradiates, with the infrared ray 11, an area larger than the image capturing area 21 and including the entire image capturing area 21 such that the entire image capturing area 21 can be irradiated with the infrared ray 11. The infrared light 1 is provided at such a position that the infrared light 1 can irradiate the image capturing area 21 with the infrared ray 11. For example, the infrared light 1 is provided to the dashboard of the vehicle, but it is sufficient if the installation position of the infrared light 1 is such a position that the infrared light 1 can irradiate the image capturing area 21 with the infrared ray 11.

The image-capturing apparatus 2 is provided at such a position that the image-capturing apparatus 2 can capture images of the image capturing area 21 in the interior of the vehicle. For example, the image-capturing apparatus 2 is provided to the dashboard of the vehicle in front of the driver's seat, and captures images of the image capturing area 21. In one specific example, the image-capturing apparatus 2 is provided at the dashboard and between the windshield and the steering wheel. Note that the installation position of the image-capturing apparatus 2 is not limited to this, but it is sufficient if the image-capturing apparatus 2 is at such a position that the image-capturing apparatus 2 can capture images of the image capturing area 21.

Figure 3:
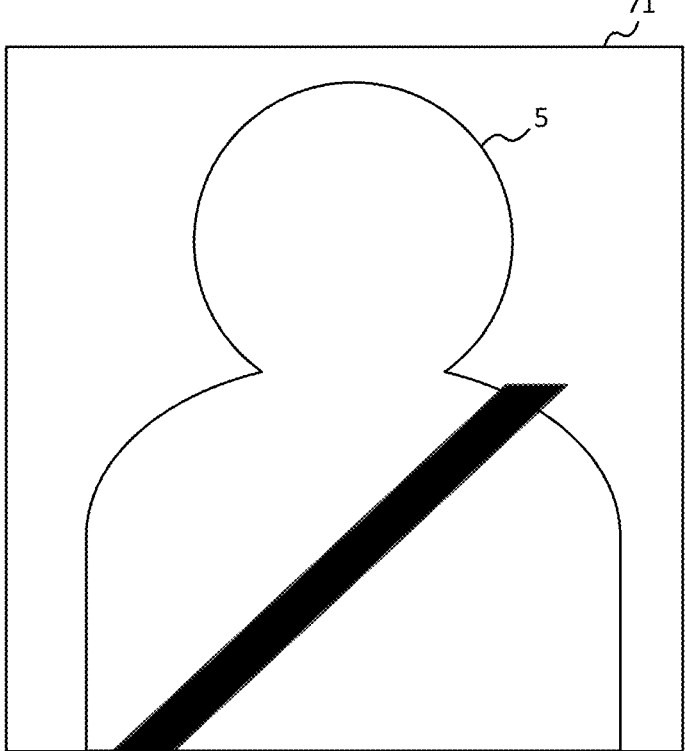
FIG. 3 is a schematic diagram of an infrared image captured by the image-capturing apparatus.

The image-capturing apparatus 2 captures an image of the image capturing area 21, and generates an image. For example, the image-capturing apparatus 2 captures an image of the image capturing area 21 in a state where the infrared light 1 irradiates the image capturing area 21 with the infrared ray 11, and generates an infrared image 71. FIG. 3 is a schematic diagram of the infrared image 71 captured by the image-capturing apparatus 2. Specifically, after performing exposure correction in a state where the image capturing area 21 is irradiated with the infrared ray 11, the image-capturing apparatus 2 captures an image of the image capturing area 21, and generates the infrared image 71. More specifically, after performing exposure correction, the image-capturing apparatus 2 captures an image of the image capturing area 21, and generates the infrared image 71. Exposure correction is a process of changing at least either the aperture value or exposure time such that gradations of a captured infrared image of the image capturing area 21 become appropriate.

By analyzing the infrared image 71, the driving assistance apparatus 3 extracts features of the driver 5 such as the positions of the facial outline, eyes, nose, and mouth, and recognizes the driver 5 in the infrared image 71. However, in a case where the posture of the driver 5 to whom an anomaly has happened is distorted, and is not a normal driving posture, the driver 5 will be not included in the image capturing area 21. In the following explanation, an anomaly in which the posture of the driver 5 is no longer a normal driving posture is called a postural mdistortion.

For example, postural distortions include a forward-fallen posture, a looking-down posture, a backward-leaning posture, a shrimp-like backward-arched posture, a head sideways-fallen posture, a sideways-fallen posture, and a sideways-leaning posture. In the state of the forward-fallen posture, the driver has fallen forward, and the face of the driver is close to the steering wheel. In the state of the looking-down posture, the face of the driver is turned down. In the state of the backward-leaning posture, the upper half of the body of the driver is leaning backward, and the face is turned up. In the state of the shrimp-like backward-arched posture, the upper half of the body of the driver is arched backward, and the face is turned up. In the state of the head sideways-fallen posture, the head of the driver is leaning leftward or rightward. In the state of the sideways-fallen posture, the upper half of the body of the driver is leaning leftward or rightward, and the face is leaning in the same direction as the leaning of the upper half of the body. In the state of the sideways-leaning posture, the upper half of the body of the driver is leaning leftward or rightward.

In a case where a postural distortion like the ones illustrated above has happened to the driver 5, the driving assistance apparatus 3 cannot extract features of the face of the driver 5 from the infrared image 71, and accordingly cannot recognize the driver 5 in the infrared image 71. In a case where it is not possible to recognize the driver 5 in the infrared image 71, the driving assistance apparatus 3 determines that a postural distortion anomaly has happened to the driver 5. Specifically, in a case where a state where a postural distortion anomaly in which it is not possible to recognize the driver 5 in the infrared image 71 has happened is continuing, the driving assistance apparatus 3 determines that a postural distortion has happened, and causes the output section 4 to give a warning. The output section 4 includes a speaker or a buzzer that gives a warning. In a case where there is a postural distortion of the driver 5, the driving assistance apparatus 3 controls the output section 4 to give a message informing an anomaly.

Meanwhile, a partial area in the image capturing area 21 is hit by the sunlight 6 in some cases (see FIG. 2). For example, in a case where there is the sun in front of the vehicle or in front of the left side of the vehicle, the sunlight

6 through the windshield or a door window of the vehicle hits a determination area 22, which is a second area including the left shoulder and chest of the driver 5. The determination area 22 becomes brighter than areas in the image capturing area 21 which are not hit by the sunlight 6.

In a case where an infrared image is captured in a state where the determination area 22 is hit by the sunlight 6, a determination portion capturing an image of the determination area 22 in the infrared image becomes brighter than portions capturing images of areas in the image capturing area 21 other than the determination area 22. In particular, in a case where the image-capturing apparatus 2 is provided to the dashboard of the vehicle, the distance between the determination area 22 and the image-capturing apparatus 2 is shorter than the distances between areas other than the determination area 22 and the image-capturing apparatus 2. Accordingly, the brightness of the determination area 22 becomes too brighter than the areas other than the determination area 22 undesirably. In this case, gradations of an infrared image cannot be made appropriate even if the image-capturing apparatus 2 performs exposure correction so as to prevent gradations of the determination portion from being lost, and clipping occurs in the infrared image undesirably, in some cases.

Clipping is a phenomenon in which gradations of an infrared image are lost. Specific examples of clipping include a flared highlight in which the pixel values of pixels of an infrared image are saturated, and gradations of the infrared image are lost, and a blocked up shadow in which the pixel values of pixels are too small because the exposure amount is insufficient, and gradations of the infrared image are lost. For example, in a case where the determination area 22 is too bright, the pixel values of pixels of a capture infrared image are saturated even if the aperture value and the exposure time are reduced, and a flared highlight occurs. In addition, as a result of reducing the aperture value and the exposure time so as to prevent gradations of the determination area 22 from being lost, the exposure amounts of portions in the image capturing area 21 other than the determination area 22 become insufficient, and a blocked up shadow occurs, in some cases.

Figure 4:
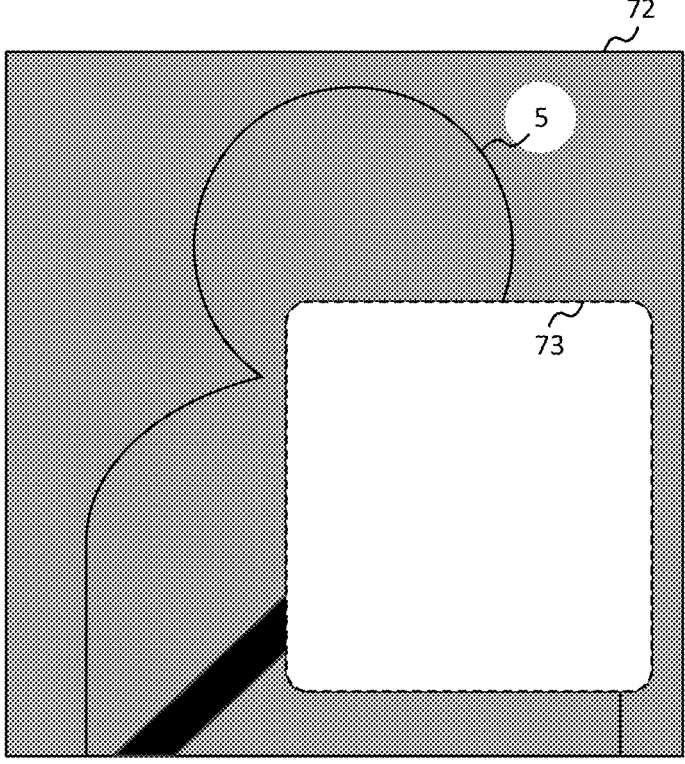
FIG. 4 is a figure for explaining an infrared image from which gradations have been lost.

FIG. 4 is a figure for explaining an infrared image 72 from which gradations have been lost. A determination portion 73 of the infrared image 72 is a portion capturing an image of the determination area 22. Gradations are lost from the determination portion 73 of the infrared image 72 in FIG. 4 because pixel values are saturated, and a flared highlight has occurred. In addition, gradations of portions of the infrared image 72 other than the determination portion 73 are lost because the exposure amounts are insufficient, and a blocked up shadow has occurred. In this case, the driving assistance apparatus 3 cannot extract features of the face of the driver 5 such as the outline of the jaw, and accordingly cannot recognize the driver 5 in the infrared image 72. In a case where it is not possible to recognize the driver 5 in the infrared image 72, it is determined that a postural distortion has happened to the driver 5 although the driver 5 is driving at a normal driving posture, and a warning is given undesirably, in some cases.

Meanwhile, whether or not the determination area 22 is hit by the sunlight 6 changes due to the influence of the positions of the sun and nearby buildings, and the like in relation to the vehicle. Then, in a case where the determination area 22 is no longer hit by the sunlight 6 because the positions of the sun and nearby buildings in relation to the vehicle have changed before a warning is given, it becomes possible for the image-capturing apparatus 2 to perform exposure correction so as to prevent gradations of an infra-red image from being lost. As a result, a flared highlight of infrared images is solved. Since it becomes possible to recognize the driver 5 in infrared images in this case, a warning is not given.

In view of this, in a case where it is not possible to recognize the driver 5 in infrared images, and a flared highlight or a blocked up shadow has occurred in infrared images, the driving assistance apparatus 3 makes time until a warning is given longer. In a case where the positions of the sun and nearby buildings in relation to the vehicle have changed before a warning is given, and the determination area 22 is no longer hit by the sunlight 6, a flared highlight of infrared images is solved. In a case where a flared highlight of infrared images is solved, it becomes possible for the driving assistance apparatus 3 to recognize the driver 5 in the infrared images, and accordingly a warning about a postural distortion is not given. That is, the driving assistance apparatus 3 reduces false warnings by making time until a warning is given longer in a case where a flared highlight has occurred in infrared images. Hereinafter, a process to be executed by the driving assistance apparatus 3 is explained specifically.

The driving assistance apparatus 3 has a storage section 31 and a control section 32. The storage section 31 is a storage medium including a ROM (Read Only Memory), a RAM (Random Access Memory), a hard disk, and the like. The storage section 31 stores programs to be executed by the control section 32.

For example, the control section 32 is a computational resource including a processor such as a CPU (Central Processing Unit). By executing programs stored on the storage section 31, the control section 32 realizes functions as an acquiring section 321, a determining section 322, a setting section 323, and a notification control section 324.

The acquiring section 321 acquires an infrared image from the image-capturing apparatus 2. For example, the acquiring section 321 acquires an infrared image captured by the image-capturing apparatus 2 in a state where the image capturing area 21 is irradiated with the infrared ray 11. Specifically, the acquiring section 321 acquires an infra-red image captured by the image-capturing apparatus 2 after the image-capturing apparatus 2 has performed exposure correction. In addition, the acquiring section 321 acquires, from the image-capturing apparatus 2, an image-capturing time at which the infrared image has been captured. Spe-cifically, the acquiring section 321 acquires, from the image-capturing apparatus 2, image information in which the infrared image is associated with an image-capturing time at which the captured image has been captured.

The determining section 322 determines whether or not it is possible to recognize the driver 5 in the infrared image. The determining section 322 determines that it is possible to recognize the driver 5 in the infrared image in a case where features of the face of the driver 5 can be extracted by analyzing the infrared image. The determining section 322 determines that it is not possible to recognize the driver 5 in the infrared image in a case where features of the face of the driver 5 cannot be extracted even by analyzing the infrared image. The determining section 322 determines whether or not a flared highlight has occurred in the infrared image in a case where it is not possible to recognize the driver 5.

Meanwhile, time periods during which the determination area 22 is hit by the sunlight 6, and time periods during which the determination area 22 is not hit by the sunlight 6 are predetermined. For example, the determination area 22 is hit by the sunlight 6 in a first time period from sunrise until a time which is predetermined time after sunrise, and a second time period from a time which is predetermined time before sunset until sunset. However, the determination area 22 is not hit by the sunlight 6 in a time period including times at which the sun is in the south since the top surface of the interior of the vehicle blocks the sunlight 6. In addition, the determination area 22 is not hit by the sunlight 6 in the time period after sunset and before sunrise. In this manner, the likelihood of occurrence of a flared highlight in infrared images is low in time periods during which the determination area 22 is not hit by the sunlight 6, and accordingly it is not necessary to determine whether or not a flared highlight has occurred.

In view of this, the determining section 322 determines whether or not the image-capturing time at which the infrared image has been captured is included in a time period during which the determination area 22 is hit by the sunlight 6. For example, time periods during which the determination area 22 is hit by the sunlight 6 are the first time period from the time of sunrise of a date of image-capturing on which the infrared image has been captured until a time which is predetermined time after the time of sunrise, and the second time period from a time which is predetermined time before the time of sunset until the time of sunset.

The determining section 322 makes longer the predeter-mined time of the first time period and the second time period as the time from sunrise until sunset of the date of image-capturing decreases. For example, the specific values of the predetermined time are two hours or three hours, but these are not the sole examples. For example, in a case where the sunrise time is 6:45, and the sunset time is 16:30, the determining section 322 sets the first time period to the three hours from 6:45 until 9:45, and sets the second time period to the two hours from 14:30 until 16:30. In a case where the sunrise time is 5:45, and the sunset time is 17:30, the determining section 322 sets the first time period to the two hours from 5:45 until 7:45, and sets the second time period to the two hours from 15:30 until 17:30.

The determining section 322 determines whether or not a flared highlight has occurred in an infrared image in a case where an image-capturing time is included in either the first time period or the second time period. The determining section 322 does not determine whether or not a flared highlight has occurred in an infrared image in a case where the image-capturing time is included in neither the first time period nor the second time period. In other words, the determining section 322 does not determine whether or not a flared highlight has occurred in an infrared image in a case where the image-capturing time is included in a third time period which is the entire time period other than the first time period and the second time period of the day. In this manner, in a time period during which the likelihood of occurrence of a flared highlight in an infrared image is high, the determining section 322 determines whether or not a flared highlight has occurred, and does not determine whether or not a flared highlight has occurred in a case where the likelihood of occurrence of a flared highlight is low. As a result, the determining section 322 can reduce unnecessary determinations, and accordingly can reduce a waste of computational resources.

The determining section 322 determines whether or not a flared highlight has occurred in an infrared image on the basis of whether or not the pixel values of pixels of the determination portion 73 are equal to or greater than a predetermined value. The predetermined value is the maxi-mum value of signals that can be processed by the image-capturing apparatus 2, but may be a value smaller than the maximum value. For example, the predetermined value is greater than half the maximum value of signals that can be processed, and smaller than the maximum value. In one specific example, the predetermined value is the value which is 90% of the maximum value of signals that can be processed. The determining section 322 determines that a flared highlight has occurred in an infrared image in a case where the pixel values of pixels of the determination portion 73 are equal to or greater than the predetermined value, and determines that a flared highlight has not occurred in the infrared image in a case where the pixel values of the pixels of the determination portion 73 are smaller than the predetermined value.

The determining section 322 may determine whether or not a flared highlight has occurred in an infrared image on the basis of whether or not a statistic of the pixel values of a plurality of pixels included in the determination portion 73 is equal to or greater than the predetermined value. The statistic is any of the average value, median, sum total, maximum value, and minimum value of the pixel values of a plurality of pixels included in the determination portion 73. The statistic is desirably the average value, the median, or the maximum value. In one specific example, in a case where the maximum value of the pixel values of pixels of the determination portion 73 is smaller than the predetermined value, it can be said that the pixel values of the pixels are not saturated, and that gradations of the determination portion 73 are not lost, and accordingly the determining section 322 determines that a flared highlight has not occurred in the infrared image.

The determining section 322 determines that a flared highlight has occurred in an infrared image in a case where the statistic of the pixel values of pixels of the determination portion 73 is equal to or greater than the predetermined value. For example, the determining section 322 determines that a flared highlight has occurred in an infrared image in a case where the average value, median, or minimum value of the pixel values of pixels of the determination portion 73 is equal to or greater than the predetermined value. Specifically, in a case where the minimum value of the pixel values of pixels of the determination portion 73 is equal to or greater than the predetermined value, it is considered that the pixel values of the pixels are saturated, and that gradations of the determination portion 73 are lost, and accordingly the determining section 322 determines that a flared highlight has occurred in the infrared image.

A flared highlight occurs in an infrared image due to the influence of the infrared ray 11 radiated by the infrared light 1, in some cases. In such a case, by re-determining whether or not a flared highlight has occurred in an infrared image on the basis of a captured image captured in a state where there is not irradiation with the infrared ray, the reliability of determinations as to whether or not a flared highlight has occurred in an infrared image can be enhanced. Hereinafter, a determination process based on a captured image captured in a state where there is not irradiation with an infrared ray is explained.

In a case where it is determined that a flared highlight has occurred in an infrared image, the acquiring section 321 acquires a captured image captured in a state where there is not irradiation with the infrared ray 11. Specifically, in a case where it is determined that a flared highlight has occurred in an infrared image, the acquiring section 321 causes the infrared light 1 to stop irradiation with the infrared ray 11. By causing the image-capturing apparatus 2 to generate a captured image after causing the infrared light 1 to stop irradiation with the infrared ray 11, the acquiring section 321 acquires the captured image in which the image capturing area 21 is not irradiated with the infrared ray 11. Thereby, the acquiring section 321 can acquire a captured image captured in a state where the image capturing area 21 is not irradiated with the infrared ray 11, and the image capturing area 21 is irradiated with the sunlight 6.

The determining section 322 determines whether or not it is possible to recognize the driver 5 in a captured image captured by the image-capturing apparatus 2 in a state where the infrared light has stopped irradiation with the infrared ray 11. By using a captured image captured in a state where there is not irradiation with the infrared ray 11, but there is irradiation with the sunlight 6, the determining section 322 can determine whether or not it is possible to recognize the driver 5 without the influence of the infrared ray 11 on the image capturing area 21, but with the influence of the sunlight 6 on the image capturing area 21. In a case where it is possible to recognize the driver 5 in the captured image, the determining section 322 determines again that a flared highlight has occurred in the infrared image. Specifically, the determining section 322 continues determining that a flared highlight has occurred in an infrared image in a case where it is determined that a flared highlight has occurred in the infrared image, and it is possible to recognize the driver 5 in a captured image. In this manner, by recognizing the driver 5 in a captured image captured in a state where there is not irradiation with the infrared ray in a case where a flared highlight has occurred in an infrared image, the determining section 322 can enhance the reliability of determinations that a flared highlight has occurred in an infrared image when the driver 5 is at a normal driving posture.

The determining section 322 determines that there is a postural distortion anomaly of the driver 5 in a case where it is not possible to recognize the driver 5 in a captured image. Specifically, the determining section 322 cancels a determination that a flared highlight has occurred in an infrared image, and determines that there is a postural distortion anomaly of the driver 5. In a case where a flared highlight has occurred in an infrared image, the determining section 322 can appropriately determine whether or not there is a postural distortion anomaly of the driver 5 on the basis of whether or not it is possible to recognize the driver 5 in a captured image captured in a state where there is not irradiation with the infrared ray 11.

The setting section 323 sets waiting time between a time point at which it has become not possible to recognize the driver 5 and a time point at which predetermined control is started. For example, the predetermined control is at least either notification control to give a warning or automatic stop control to stop the vehicle. The setting section 323 sets first waiting time between a time point at which it has become not possible to recognize the driver 5 in infrared images and a time point at which notification control is started. In addition, the setting section 323 sets second waiting time between a time point at which it has become not possible to recognize the driver 5 and a time point at which automatic stop control is started. The first waiting time and the second waiting time may be the same or may be different. Specifically, the setting section 323 sets waiting time between a time point at which the notification control section 324 has caused the output section 4 to give a warning upon recognition of the driver 5 becoming not possible and a time point at which automatic stop control is started.

The setting section 323 makes the waiting time longer than reference time in a case where it is determined that a flared highlight has occurred in infrared images. The waiting time is anomaly determination time between a time point at which it has become not possible to recognize the driver 5 in infrared images and a time point at which it is determined that a postural distortion has happened. The reference time is reference time of the anomaly determination time, and, for example, is ten seconds, but this is not the sole example. In one specific example, in a case where a flared highlight has occurred in infrared images, the setting section 323 sets the waiting time to 15 seconds, which is longer than the reference time, ten seconds.

The setting section 323 sets the waiting time to the reference time in a case where a flared highlight has not occurred in infrared images. The setting section 323 sets the waiting time back to the reference time in a case where, after it is determined that a flared highlight has occurred in infrared images, it is determined that a flared highlight has not occurred in infrared images. That is, the setting section 323 sets the waiting time having been made longer than the reference time back to the reference time in a case where a flared highlight of infrared images has been solved. Thereby, the setting section 323 can appropriately set the waiting time depending on whether or not a flared highlight has occurred in infrared images.

In addition, the setting section 323 may make the waiting time shorter than the reference time in a case where the determining section 322 cancels a determination that a flared highlight has occurred in infrared images, and determines that there is a postural distortion anomaly of the driver 5. In this case, the setting section 323 sets the waiting time to five seconds, which is shorter than the reference time, ten seconds. By doing so, it becomes possible for the setting section 323 to give a warning more promptly in a case where there is an anomaly of the driver 5.

The notification control section 324 causes the output section 4 to give a warning in a case where elapsed time that has elapsed since it has become not possible to recognize the driver 5 in infrared images has become equal to or longer than the waiting time set by the setting section 323. Specifically, the notification control section 324 causes a message informing an anomaly to be given as a warning in a case where the elapsed time has become equal to or longer than the waiting time. For example, the message informing an anomaly is a message "An anomalous driving posture is observed. Please drive at a normal driving posture," but this is not the sole example. The notification control section 324 stops the warning in a case where the driver 5 has performed operation for stopping the warning.

The notification control section 324 does not cause the output section 4 to give a warning in a case where it has been possible to recognize the driver 5 in infrared images before the elapsed time has become equal to or longer than the waiting time. Specifically, in a case where the determining section 322 determines that a flared highlight has not occurred in infrared images before the elapsed time becomes equal to or longer than the waiting time, the notification control section 324 sets the elapsed time to zero, and does not cause the output section 4 to give a warning until the elapsed time becomes equal to or longer than the waiting time again.

As described above, the notification control section 324 causes a warning to be given in a case where elapsed time since it has become not possible to recognize the driver 5 in infrared images has become equal to or longer than the waiting time set by the setting section 323. That is, since the waiting time is set longer than the reference time in a case where a flared highlight has occurred in infrared images, time between a time point at which it has become not possible to recognize the driver 5 in infrared images and a time point at which a warning is given becomes longer. If the positions of the sun and buildings near the vehicle in relation to the vehicle have changed during the waiting time until a warning is given, and the determination area 22 is no longer hit by the sunlight 6, a flared highlight of infrared images is solved. Since it becomes possible to recognize the driver 5 in a case where a flared highlight of infrared images is solved, the notification control section 324 does not cause the output section 4 to give a warning. In this manner, by making time until a warning is given longer in a case where a flared highlight has occurred in infrared images, the driving assistance apparatus 3 can reduce false warnings.

It is desirable that a warning is given promptly in a case where an anomaly has happened to the driver 5 even if a flared highlight has occurred in an infrared image. In view of this, the driving assistance apparatus 3 gives a warning if there is an anomaly of driving operation performed by the driver 5. Hereinafter, a process of giving a warning in a case where there is an anomaly of driving operation is explained.

The acquiring section 321 acquires operation information about driving operation performed by the driver 5. For example, the driving operation is at least any one of steering operation, accelerator operation, and brake operation. The acquiring section 321 sequentially acquires, as operation information, sensing values sensed by each of a sensor that senses the rotation angle of the steering, a sensor that senses the step-on amount of the accelerator pedal, and a sensor that senses the step-on amount of the brake pedal.

Next, the determining section 322 determines whether or not there is an anomaly of driving operation represented by the operation information. For example, the determining section 322 determines that there is an anomaly of driving operation represented by the operation information acquired from a time point which is predetermined time before the current time point until the current time point in a case where the driving operation represented by the operation information is different from driving operation performed by the driver 5 at normal time. Specifically, first, the determining section 322 decides a degree of similarity representing the degree to which the driving operation represented by the acquired operation information and the driving operation performed by the driver 5 at normal time are similar. Next, the determining section 322 determines whether or not there is an anomaly of the driver 5 on the basis of the degree of similarity. The determining section 322 determines that the driver 5 is normal in a case where the decided degree of similarity is within a tolerance range representing driving operation that can be tolerated as driving operation performed by the driver 5 at normal time. The determining section 322 determines that there is an anomaly of the driver 5 in a case where the decided degree of similarity is outside the tolerable range.

The notification control section 324 causes the output section 4 to give a warning in a case where there is an anomaly of the driver 5. Specifically, the setting section 323 causes the output section 4 to give a warning in a case where it is determined that there is an anomaly of the driver 5, and time having elapsed since it has become not possible to recognize the driver 5 in infrared images is equal to or longer than the waiting time. Thereby, the notification control section 324 can give a warning in a case where the likelihood of occurrence of an anomaly of the driver 5 is high even if it is not possible to recognize the driver 5 in infrared images.

[Process of Setting Waiting Time]

Figure 5:
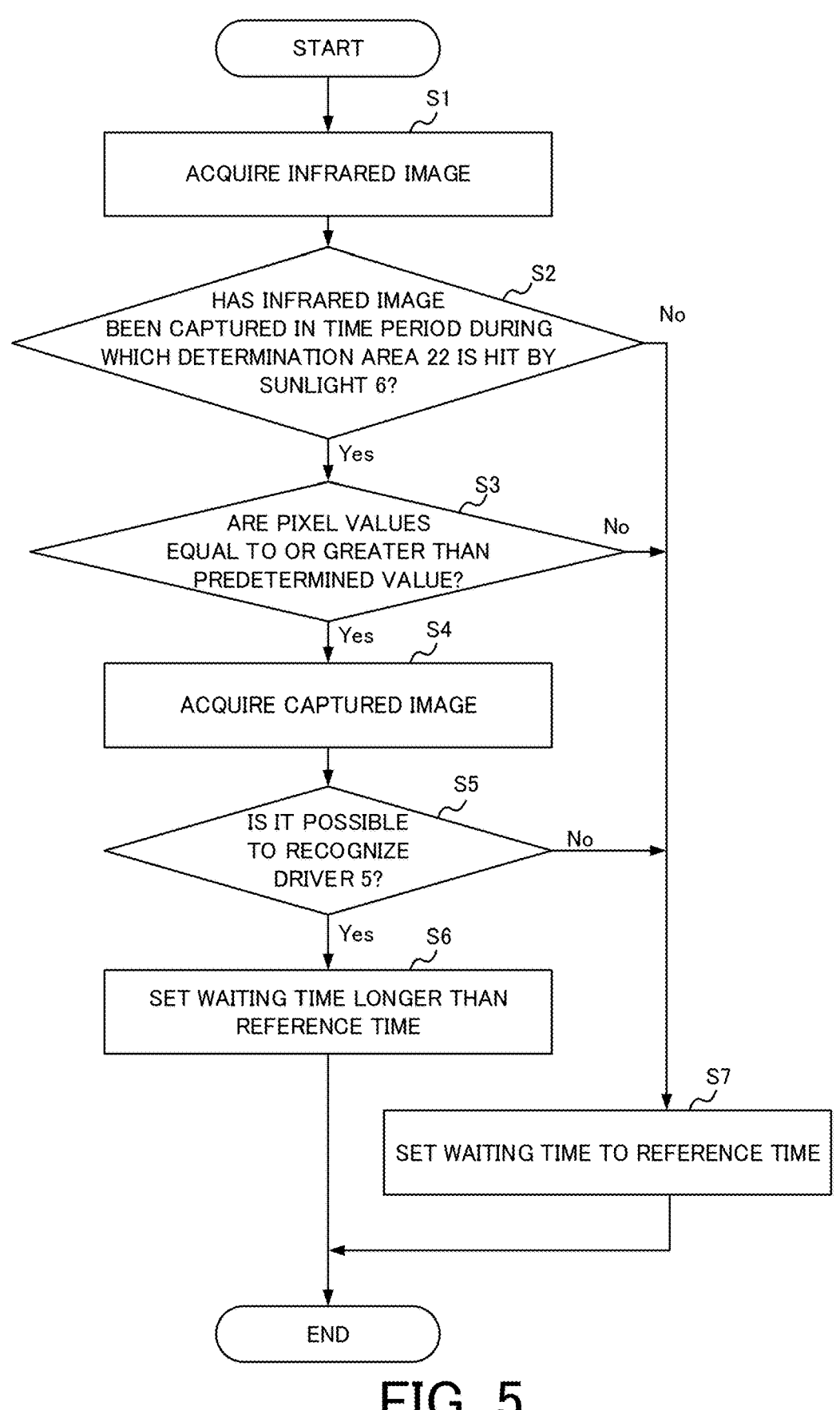
FIG. 5 is a flowchart depicting an example of a process of setting waiting time.

FIG. 5 is a flowchart depicting an example of a process of setting waiting time. The process of setting waiting time is executed at predetermined intervals while the engine of the vehicle is in operation. For example, the predetermined intervals are 100 milliseconds, but this is not the sole example.

The acquiring section 321 acquires an infrared image (Step S1). Specifically, the acquiring section 321 acquires, from the image-capturing apparatus 2, an infrared image captured after exposure correction is performed, and an image-capturing time at which the captured image has been captured.

The determining section 322 determines whether or not an infrared image has been captured in a time period during which the determination area 22 is hit by the sunlight 6 (Step S2). For example, the determining section 322 determines that an infrared image has been captured in a time period during which the determination area 22 is hit by the sunlight 6 in a case where the image-capturing time at which the infrared ray has been captured is included in a predetermined time period. The determining section 322 determines that an infrared image has been captured in a time period during which the determination area 22 is hit by the sunlight 6 in a case where the image-capturing time is included in the first time period from sunrise until a time which is predetermined time after sunrise, or included in the second time period from a time which is predetermined time before sunset until sunset. The determining section 322 determines that the infrared image has been captured in a time period during which the determination area 22 is not hit by the sunlight 6 in a case where the image-capturing time is included a time period which is neither the first time period nor the second time period.

In a case where it is determined that the infrared image has been captured in a time period during which the determination area 22 is hit by the sunlight 6 (Yes at Step S2), the determining section 322 determines whether or not the pixel values of pixels of the determination portion 73 capturing the determination area 22 are equal to or greater than a predetermined value (Step S3). For example, the determining section 322 determines whether or not a statistic of the pixel values of a plurality of pixels included in the determination portion 73 are equal to or greater than the predetermined value. Specifically, the determining section 322 determines whether or not the average value of the pixel values of a plurality of pixels is equal to or greater than the predetermined value.

In a case where it is determined that the pixel values of pixels are equal to or greater than the predetermined value (Yes at Step S3), the acquiring section 321 acquires a captured image captured in a state where there is not irradiation with the infrared ray 11 (Step S4). Specifically, the acquiring section 321 causes the infrared light 1 to stop irradiation with the infrared ray 11, and causes the image-capturing apparatus 2 to capture an image of the image capturing area 21, and generate a captured image.

The determining section 322 determines whether or not it is possible to recognize the driver 5 in the captured image (Step S5). The determining section 322 determines that it is not possible to recognize the driver 5 in the captured image in a case where features of the face of the driver 5 cannot be extracted from the captured image. The determining section 322 determines that it is possible to recognize the driver 5 in the captured image in a case where features of the face of driver 5 can be extracted from the captured image.

In a case where it is possible to recognize the driver 5 in the captured image (Yes at Step S5), the setting section 323 makes the waiting time longer than the reference time (Step S6). Specifically, in a case where a flared highlight has occurred in the infrared image, and it is possible to recognize the driver 5 in the captured image, the setting section 323 makes the waiting time longer than the reference time.

In a case where it is determined that the infrared image has been captured in a time period during which the determination area 22 is not hit by the sunlight 6 (No at Step S2), the setting section 323 sets the waiting time to the reference time (Step S7). In addition, in a case where the pixel values of pixels of the determination portion 73 of the infrared image are smaller than the predetermined value (No at Step S3), and it is not possible to recognize the driver 5 in the captured image (No at Step S5), the setting section 323 sets the waiting time to the reference time (Step S7).

Note that clipping of an infrared image occurs not only in a case where the determination area 22 is hit by the sunlight 6, but also in a case where a hand of the driver 5 gets close to the image-capturing apparatus 2. If a hand of the driver 5 gets close to the image-capturing apparatus 2, the infrared ray 11 of the infrared light 1 is reflected by the hand of the driver 5, and the reflected light enters the image-capturing apparatus 2. In this case, the image-capturing apparatus 2 performs exposure correction so as to prevent gradations of the hand of the driver 5 from being lost; as a result, a blocked up shadow in which the exposure amounts of portions other than the hand of the driver 5 decrease, and gradations of portions are lost occurs undesirably. Even in such a case, the driving assistance apparatus 3 according to the present embodiment can reduce false warnings by making the waiting time longer.

[Effects of Driving Assistance Apparatus 3]

As explained above, in a case where it is not possible to recognize the driver 5 of the vehicle in an infrared image captured while the image capturing area 21 including the driver's seat where the driver 5 is seated is irradiated with the infrared ray 11, the driving assistance apparatus 3 determines whether or not a flared highlight has occurred in the infrared image on the basis of whether or not the pixel values of pixels of the determination portion 73 in the image capturing area 21 of the infrared image which portion is hit by the sunlight 6 are equal to or greater than the predetermined value. Then, in a case where it is determined that a flared highlight has occurred in the infrared image, the driving assistance apparatus 3 makes the waiting time longer than the reference time, the waiting time being time between a time point at which it has become not possible to recognize the driver 5 in the infrared image and a time point at which a warning is given.

Since the waiting time is set longer than the reference time in a case where a flared highlight has occurred in infrared images, time between a time point at which it has become not possible to recognize the driver 5 in infrared images and a time point at which a warning is given becomes longer. If the position of the sun in relation to the vehicle and the influence of buildings near the vehicle and the like have changed during the waiting time until a warning is given, and the determination area 22 is no longer hit by the sunlight 6, a flared highlight of infrared images is solved. Since it becomes possible to recognize the driver 5 in a case where a flared highlight of infrared images is solved, a warning is not given. In this manner, by making time until a warning is given longer in a case where a flared highlight has occurred in infrared images, the driving assistance apparatus 3 can reduce false warnings.

Whereas the present invention has been explained using embodiments thus far, the technical scope of the present invention is not limited by the scope of the description of the embodiments described above, but can be modified and changed variously within the scope of the gist. For example, all or some of apparatuses can be configured in a functionally or physically distributed/integrated manner in any units. In addition, embodiments of the present invention include also new embodiments that are generated by any combination of a plurality of embodiments. Effects of the new embodiments generated by the combination combine effects of the original embodiments.

What is claimed is:

1. A driving assistance apparatus comprising:
an acquiring section that acquires an infrared image captured while a first area including a driver's seat where a driver of a vehicle is seated is irradiated with an infrared ray;
a determining section that determines whether or not a flared highlight has occurred in the infrared image in a case where it is not possible to recognize the driver in the infrared image, on a basis of whether or not a pixel value of a pixel of a determination portion capturing an image of a second area which is in the first area in the infrared image and is hit by sunlight is equal to or greater than a predetermined value; and
a setting section that makes waiting time longer than reference time, the waiting time being time between a time point at which it has become not possible to recognize the driver in the infrared image and a time point at which a warning is given in a case where it is determined that the flared highlight has occurred in the infrared image.

2. The driving assistance apparatus according to claim 1, wherein
the acquiring section acquires a captured image captured in a state where there is not irradiation with the infrared ray in a case where the determining section determines that the pixel value of the pixel of the determination portion is equal to or greater than the predetermined value, and
the determining section determines that a flared highlight has occurred in the infrared image in a case where the pixel value of the pixel of the determination portion is equal to or greater than the predetermined value, and it is possible to recognize the driver in the captured image.

3. The driving assistance apparatus according to claim 1, wherein the determining section determines whether or not a flared highlight has occurred in the infrared image in a case where a time of image-capturing of the infrared image is included in a time period during which the second area is hit by sunlight.

4. The driving assistance apparatus according to claim 3, wherein the time period includes: a first time period from a sunrise time of a date of image-capturing when the infrared image has been captured until a time which is predetermined time after the sunrise time; and a second time period from a time which is the predetermined time before a sunset time of the date of image-capturing until the sunset time.

5. The driving assistance apparatus according to claim 4, wherein the determining section increases the predetermined time as time from the sunrise time of the date of image-capturing until the sunset time decreases.

6. The driving assistance apparatus according to claim 1, wherein the acquiring section acquires the infrared image captured after an image-capturing apparatus that captures the infrared image has performed exposure correction to change at least either an aperture value or exposure time.

7. The driving assistance apparatus according to claim 6, wherein the determining section determines that a flared highlight has not occurred in the infrared image in a case where the pixel value of the pixel of the determination portion of the infrared image is smaller than the predetermined value, and
the setting section sets the waiting time to the reference time in a case where the determining section determines that a flared highlight has not occurred in the infrared image.

8. The driving assistance apparatus according to claim 1, wherein the determining section determines that a flared highlight has occurred in the infrared image in a case where a statistic of pixel values of a plurality of pixels included in the determination portion is equal to or greater than the predetermined value, and determines that a flared highlight has not occurred in the infrared image in a case where the statistic is smaller than the predetermined value.

9. The driving assistance apparatus according to claim 1, wherein the waiting time is anomaly determination time between a time point at which it has become not possible to recognize the driver in the infrared image and a time point at which it is determined that an anomaly which is a deviation from a normal driving posture of the driver has occurred.

10. The driving assistance apparatus according to claim 1, wherein the determining section determines that a flared highlight has occurred in the infrared image in a case where a minimum value of pixel values of a plurality of pixels included in the determination portion is greater than half a maximum value of a signal that can be processed by an image-capturing apparatus that captures the infrared image, and is equal to or greater than the predetermined value which is smaller than the maximum value.

11. The driving assistance apparatus according to claim 1, wherein the determining section determines that a flared highlight has not occurred in the infrared image in a case where a maximum value of pixel values of a plurality of pixels included in the determination portion is greater than half a maximum value of a signal that can be processed by an image-capturing apparatus that captures the infrared image, and is smaller than the predetermined value which is smaller than the maximum value.

12. The driving assistance apparatus according to claim 1, wherein
the driving assistance apparatus comprises a notification control section that gives the warning,
the acquiring section acquires operation information about driving operation performed by the driver,
the determining section determines whether or not the driving operation represented by the operation information is anomalous, and
the notification control section gives the warning in a case where the driving operation is anomalous, and time having elapsed since it has become not possible to recognize the driver in the infrared image is equal to or longer than the waiting time set by the setting section.

13. A driving assistance method executed by a computer of a vehicle, the driving assistance method comprising:
acquiring an infrared image captured while a first area including a driver's seat where a driver of the vehicle is seated is irradiated with an infrared ray;
determining whether or not a flared highlight has occurred in the infrared image in a case where it is not possible to recognize the driver in the infrared image, on a basis of whether or not a pixel value of a pixel of a determination portion capturing an image of a second area which is in the first area in the infrared image and is hit by sunlight is equal to or greater than a predetermined value; and making waiting time longer than reference time, the waiting time being time between a time point at which it has become not possible to recognize the driver in the infrared image and a time point at which a warning is given in a case where it is determined that the flared highlight has occurred in the infrared image.

\* \* \* \* \*